(12) United States Patent
Bartman et al.

(10) Patent No.: US 7,788,860 B2
(45) Date of Patent: Sep. 7, 2010

(54) VANDAL PROOF SYSTEM FOR SECURING A FRANGIBLE FACING PLATE TO RIGID SUPPORTING STRUCTURE BY WEDGING ACTION AND A METHOD THEREFOR

(76) Inventors: Ronald R. Bartman, P.O. Box 828, Grandville, MI (US) 49468-0828;
Norman R. Mabie, P.O. Box 828, Grandville, MI (US) 49468-0828

(*) Notice: Subject to any disclaimer, the term of this patent is extended or adjusted under 35 U.S.C. 154(b) by 999 days.

(21) Appl. No.: 10/614,074

(22) Filed: Jul. 7, 2003

(65) Prior Publication Data
US 2005/0005557 A1 Jan. 13, 2005

(51) Int. Cl.
*E04H 13/00* (2006.01)
*E06B 5/00* (2006.01)
(52) U.S. Cl. .................. 52/139; 52/474; 52/506.05
(58) Field of Classification Search .............. 52/128, 52/136, 139, 235, 512, 509, 126.6, 79.5, 52/506.01, 506.06, 506.05, 506.13, 506.08, 52/483.1, 474; 27/1; 312/111
See application file for complete search history.

(56) References Cited

U.S. PATENT DOCUMENTS

| | | | | | |
|---|---|---|---|---|---|
| 1,300,173 | A | * | 4/1919 | Kennedy | 52/136 |
| 3,434,262 | A | * | 3/1969 | Lawrence | 52/787.12 |
| 3,579,942 | A | * | 5/1971 | Cole | 52/787.12 |
| 3,735,544 | A | * | 5/1973 | Longinotti | 52/235 |
| 3,747,291 | A | * | 7/1973 | Perigo et al. | 52/127.7 |
| 3,754,805 | A | * | 8/1973 | Pangburn et al. | 312/111 |
| 3,936,927 | A | * | 2/1976 | Schneider | 52/705 |
| 4,452,023 | A | * | 6/1984 | Stahlberg | 52/378 |
| 4,519,173 | A | * | 5/1985 | Roberts | 52/235 |
| 4,520,601 | A | * | 6/1985 | Stacey, Jr. | 52/127.7 |
| 4,545,167 | A | * | 10/1985 | Brock | 52/509 |
| 4,614,066 | A | * | 9/1986 | Koppenberg | 52/134 |
| 4,638,618 | A | * | 1/1987 | Iesaka et al. | 52/509 |
| 4,644,711 | A | * | 2/1987 | Eickhof | 52/127.11 |
| 4,881,348 | A | * | 11/1989 | Davis | 52/127.7 |
| 5,107,641 | A | * | 4/1992 | Davis | 52/127.7 |
| 5,195,812 | A | * | 3/1993 | Eickhof | 312/257.1 |
| 5,257,490 | A | * | 11/1993 | Endo et al. | 52/511 |
| 5,419,091 | A | * | 5/1995 | Roberts | 52/509 |
| 5,428,935 | A | * | 7/1995 | Mitchell | 52/698 |
| 5,438,813 | A | * | 8/1995 | Wade | 52/747.13 |
| 5,467,571 | A | * | 11/1995 | Khatibi | 52/718.04 |
| 5,477,594 | A | * | 12/1995 | LePage | 27/1 |
| 5,540,514 | A | * | 7/1996 | Demars et al. | 403/388 |
| 5,542,225 | A | * | 8/1996 | Endo et al. | 52/511 |
| 5,625,933 | A | * | 5/1997 | Neuberger et al. | 27/1 |
| 5,644,885 | A | * | 7/1997 | Eischeid | 52/513 |
| 5,657,602 | A | * | 8/1997 | Hellander | 52/446 |
| 5,673,528 | A | * | 10/1997 | Danisch et al. | 52/506.05 |
| 5,735,643 | A | * | 4/1998 | Castonguay et al. | 405/286 |
| 5,740,637 | A | * | 4/1998 | Snow | 52/136 |
| 5,802,781 | A | * | 9/1998 | Eickhof | 52/136 |
| 5,924,256 | A | * | 7/1999 | Ito | 52/481.1 |
| 5,953,865 | A | * | 9/1999 | Rickards | 52/139 |

(Continued)

*Primary Examiner*—Gay Ann Spahn (57) ABSTRACT

Stone faceplates are secured to supporting structures in columbariums or similar environments by a non-standard star screwdriver which penetrates the exposed face of the faceplate to activate a fastening assembly having a rivet nut and screw which secures the faceplate to the supporting structure, the tightening pressure of the rivet nut screw forcing the prongs of a slotted spacer sleeve of the fastening assembly into jamming engagement with a hole in the rear of the faceplate.

10 Claims, 4 Drawing Sheets

U.S. PATENT DOCUMENTS

| | | | |
|---|---|---|---|
| 5,987,837 A * | 11/1999 | Nelson | 52/506.05 |
| 6,088,973 A * | 7/2000 | Weiss | 52/105 |
| 6,314,699 B1 * | 11/2001 | West | 52/489.1 |
| 6,347,439 B1 * | 2/2002 | Bach Lahor | 27/1 |
| 6,453,633 B1 * | 9/2002 | Wilkinson et al. | 52/506.06 |
| 6,477,923 B2 * | 11/2002 | Amis | 81/121.1 |
| 6,551,040 B1 * | 4/2003 | Terry et al. | 411/43 |
| 6,564,514 B1 * | 5/2003 | Rickards | 52/139 |
| 6,962,027 B2 * | 11/2005 | Zawinsky | 52/585.1 |
| RE39,091 E * | 5/2006 | Kuelker | 52/506.05 |
| 7,096,632 B2 * | 8/2006 | Pacione | 52/506.05 |
| 2003/0101673 A1 * | 6/2003 | West et al. | 52/489.1 |
| 2003/0217742 A1 * | 11/2003 | Chien | 125/1 |
| 2008/0075556 A1 * | 3/2008 | Smith | 411/379 |

\* cited by examiner

FIG. 5 (ENLARGED)

FIG. 4

VANDAL PROOF SYSTEM FOR SECURING A FRANGIBLE FACING PLATE TO RIGID SUPPORTING STRUCTURE BY WEDGING ACTION AND A METHOD THEREFOR

This invention pertains to a system and method for securing stone or other similar frangible material to a supporting structure in a secure manner which leaves a neat, visually uninterrupted surface that is virtually vandal proof. In addition, the stone may be removed and reinstalled at least once while retaining the foregoing advantageous characteristics.

BACKGROUND OF THE INVENTION

Although the system and method of the invention may be used in many environments it will be described in the context of securing a stone faceplate to a columbarium wall.

Columbariums are coming into increasing use for the reasons mentioned in U.S. patent application Ser. No. 09/665,148. As illustrated and described in that patent application a columbarium usually consists of a supporting structure, almost always a metal frame, which is arranged to provide a plurality of columbarium niches. Each niche is of a size to receive a receptacle containing remains and, if desired, other objects which the deceased or family members desire to be entombed therewith. The final, exterior closure member for each niche is a faceplate. Since a columbarium may take several years to be fully utilized each niche needs to be identified, repeatedly accessed and secured. The individual faceplates which comprise the columbarium must however present the same dignified external visual appearance to the eye of an observer at all times; i.e.: from the day in which the construction of the columbarium is complete until all niches have been utilized, and beyond.

At the present time securement of the faceplate to the supporting structure is achieved by the use of a bolt or stud device and a rosette that functions as a glorified nut. Because stone products tend to be quite brittle it is impossible to tighten down these rosettes lest the corners break off the stone product. Hence the rosettes become easy prey for prying fingers and are quite easily removed, creating a maintenance problem at least and a niche intrusion at most.

SUMMARY OF THE INVENTION

In the system and method of the invention a niche faceplate made of stone or other frangible material is initially tightly secured to a supporting structure using a fastening assembly which includes standard, off the shelf components. In this condition the visual appearance to the eye of an observer is that of a dignified, completely assembled structure. Indeed, by using conventional design means, such as style lines which disguise access to the fastening assembly, the fastening assemblies may be indistinguishable from the surrounding areas from a very short distance away. When it is desired to gain access to the niche for the purpose of placing an urn or other container therein, the fastening assembly is loosened by use of a conventional tool which has been slightly modified to foil vandals, the faceplate removed, the urn placed therein and then the faceplate repositioned in front of and covering the niche. Upon reassembly of the faceplate to the supporting structure the fastening assembly is again tightened to the same or even a greater degree than the original tight fit, and, as a consequence, re-access to the niche again becomes quite difficult, though not with the specialized tool described herein.

BRIEF DESCRIPTION OF THE DRAWING

The invention is illustrated more or less diagrammatically in the accompanying drawing in which.

DESCRIPTION OF A SPECIFIC EMBODIMENT

In the following description of a specific embodiment of the invention like reference numerals will refer to like or similar features from Figure to Figure of the drawing.

Figure 1:
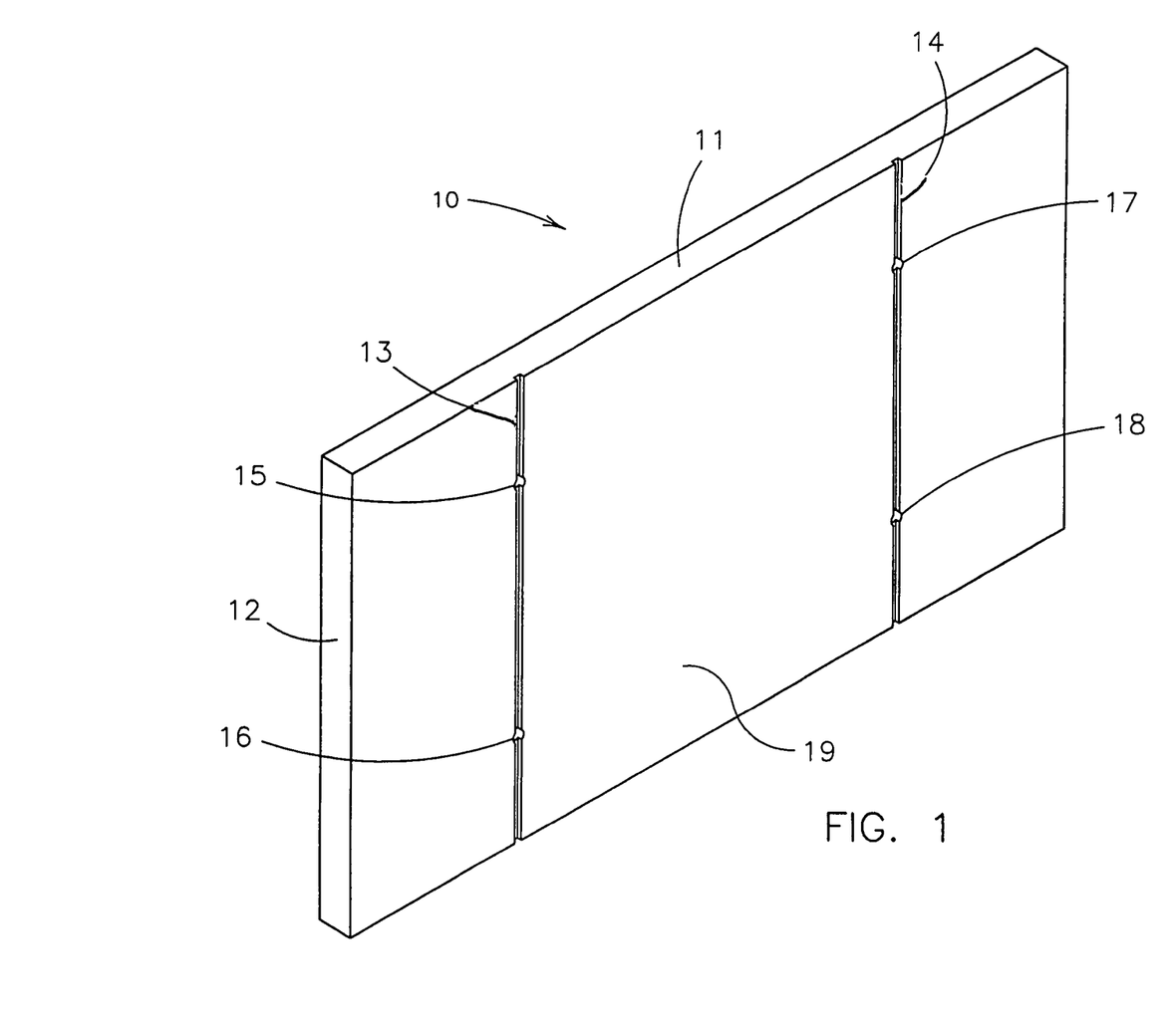
FIG. 1 is a perspective view of a faceplate in a columbarium as it appears to the eye of an observer in both its initial tightened but accessible condition and in its final tightened condition.

Referring first to FIG. 1 a faceplate for a columbarium niche is indicated generally at 10. The faceplate 10 is formed of stone or other suitable frangible material. The faceplate could even be formed of material of a quite different nature, such as metal, but stone and stone-type materials present the most challenging environment due to their inherent tendency to fracture and spall and hence stone has been chosen for description since it is the most demanding environment. A rectangular shape has been shown for purposes of description but it will be understood that the invention is applicable to any other suitable configuration, such as hexagonal. A top edge is indicated at 11 and a side edge at 12, said top edge being of the same thickness as the bottom edge of a similar faceplate located directly above faceplate 10. The side edges similarly conform to the side edges of adjacent faceplates. Two grooves, or style lines, are indicated generally at 13 and 14 each style line extending, in this instance, the full height of the faceplate. A plurality of small diameter access holes, here four, are indicated at 15, 16, 17 and 18, two in each of the style lines 13 and 14, said access holes being located in the exterior viewable surface of the face plate 10 spaced inwardly from the edges thereof as seen in FIG. 1. It will be understood that although the presence of the style lines is desirable they are not essential. Their presence does however tend to further disguise the access holes 15-18. As will be seen hereafter, it is preferable that the holes be no wider than, and preferably slightly smaller than, the width of the style lines although in this instance they are slightly wider than the style line. When faceplate 10 is assembled to similar faceplates to form a group, the access holes become features which are virtually undiscernible to the human eye from a few feet away and the front face 19 becomes simply a portion of a much larger wall space due to the abutting relationship of the face plates which together form said much larger wall space. It is not possible to assign a specific number of feet at which the holes become virtually undiscernible to the human eye. In probably a majority of situations, the access holes become indiscernible to the human eye at about 2-4 feet during daylight conditions.

Figure 2:
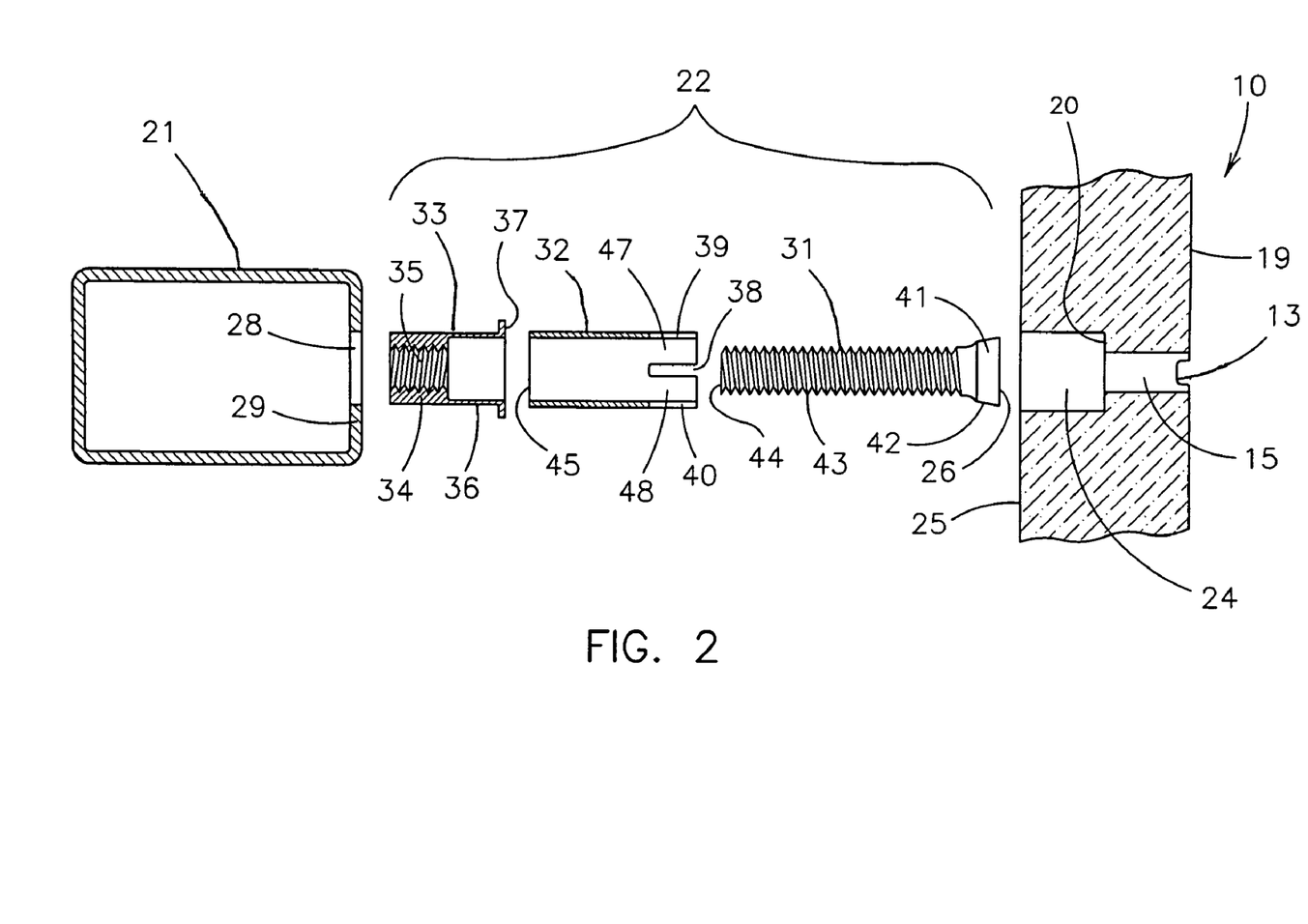
FIG. 2 is an exploded view of a horizontal section through a faceplate, a metal supporting structure of a columbarium and the fastening assembly for securing the faceplate to the supporting structure.

In FIG. 2 a fastening assembly for securing the faceplate 10 to a supporting structure, indicated generally at 21, is indicated at 22. Niche means, to which easy access is being denied by this invention, are indicated at 23 in FIG. 3 but have been omitted from FIG. 2 for convenience of description.

The right or access end of the fastening assembly as viewed in FIG. 2 is received in a rear hole 24 formed in the interior hidden surface or rear face 25 of faceplate 10. A smaller diameter access hole 15 is formed in the front face 19 of the faceplate 10, said hole 15 being axially concentric with rear hole 24. Hole 15 is formed in the left style line 13. The diameter of hole 15 may range from slightly smaller to slightly larger than the width of style line 13; here it is slightly larger.

The left, or anchor end, of the fastening assembly is received in a hole 28 formed in the wall 29 of supporting structure 21.

The fastening assembly 22 includes a TORX screw, known generically as a star screw, indicated generally at 31, a short piece of tubing, preferably made of stainless steel, indicated generally at 32, and a conventional rivet nut indicated generally at 33.

Rivet nut 33 has a thick base portion 34, which is threaded as at 35 to receive the star screw 31, and a thin shank portion 36 which terminates in flange 37. Tubing 32 has four slots, three of which are indicated at 38, 39 and 40 in its right or front end. The head 41 of star screw 31 has been modified slightly in that the side wall of the head is tapered inwardly as at 42 toward the shank portion 43. The diameter of flat end 26 of head 41 plus double the thickness of the wall of tubing 32, when added together, are slightly less than the diameter of rear hole 24.

Figure 3:
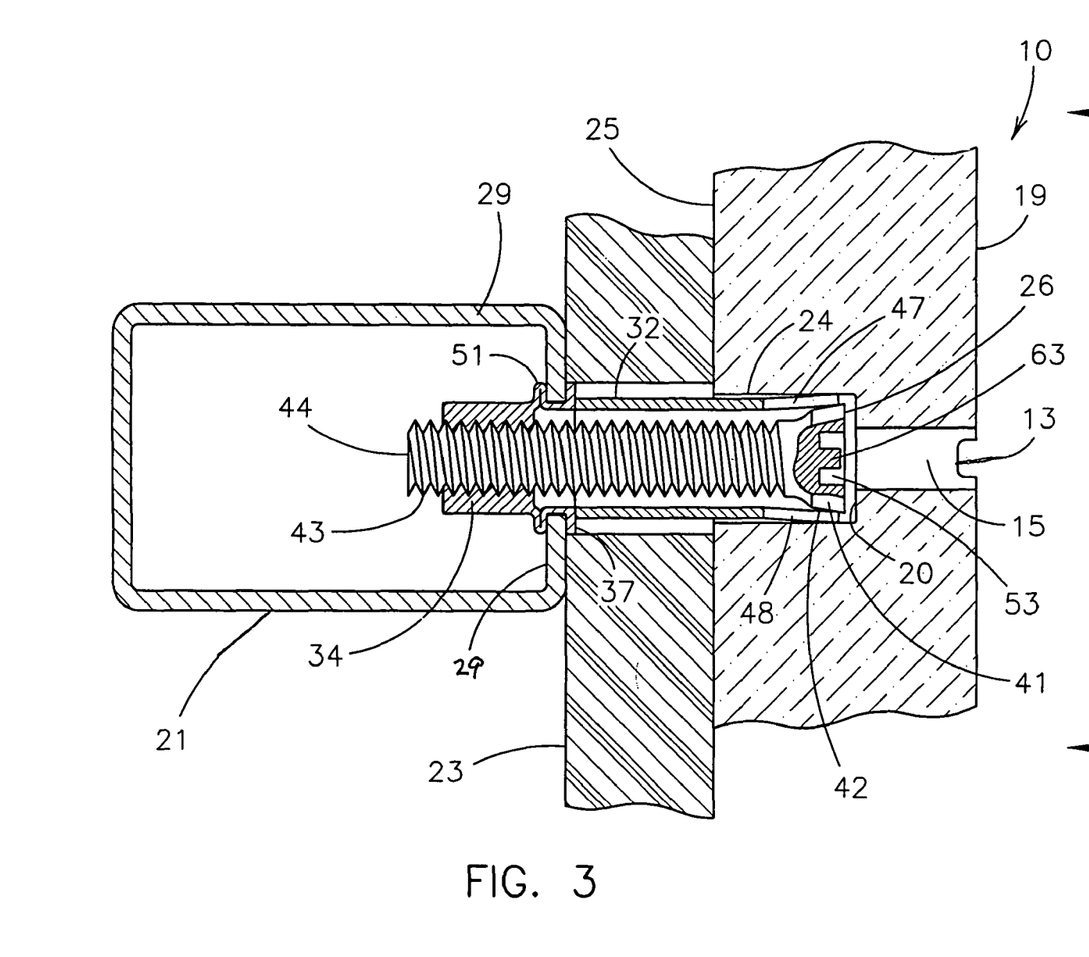
FIG. 3 is a section to a larger scale through the faceplate, a niche (or niche means), supporting structure and fastening assembly in a tightly secured condition.

FIG. 3 illustrates the fastening assembly 22 in an activated condition. Initially the thick base portion 34 and thin shank portion 36 are slid into hole 28 until flange 37 butts against the right outside surface (as viewed in FIG. 2) of wall 29 of the supporting structure 21. A tool, not shown, having a snout which has an external thread which mates with thread 35 is then threadably engaged with the threaded hole in base 34. The handles on the tool are closed, forcing the thick base portion 34 with the threaded hole 35 against the inside face of wall 29, crimping the thin shank 36 in the process, until the rivet nut 33 assumes the contour shown in FIG. 3; i.e.: with the thin shank portion 36 crimped outwardly to form a flange 51 which, in cooperation with flange 37, locks the rivet nut 33 to the supporting structure. The tool is removed, leaving the rivet nut pre-set in the supporting structure.

Thereafter, tubing 32 is slid onto shank portion 43 of the star screw 31 with the end containing slots 38, 39 and 40 butted against the tapered portion 42 of the head 41. Since the length of tubing 32 is shorter than the length of screw shank 43, the threaded end 44 of the star screw 31 will project outwardly from the smooth end 45, see FIG. 2, of the tubing 32. The threaded end 44 of screw 31 is then threaded a few turns into the threaded hole 35 in the thick base portion 34 of the pre-positioned rivet nut 33. The hole 24 in faceplate 10 is then slipped over the head 41 of star screw 31 and the slotted end of tubing 32. Further tightening of star screw 31 drives the threaded end 44 of the screw 31 deeper into the threaded hole 35 of the rivet nut 33. As the screw turns in deepening engagement with threaded hole 35 the prongs which are formed between the slots, two of which are illustrated at 47 and 48 in FIG. 2, begin to expand outwardly into tight engagement with the inner circular wall of rear hole 24 of faceplate 10 under the expanding force of tapered surface 42 on head 41.

From FIG. 3 it will be seen the above described components are so contoured that when the tapered head 42 of star screw 31 has wedged the elastically deformable prongs 47, 48 into tight engagement with the wall surface of hole 24, the face 26 of star screw 31 is spaced a slight distance inwardly from hole seat 20.

Figures 4, 5, 6:
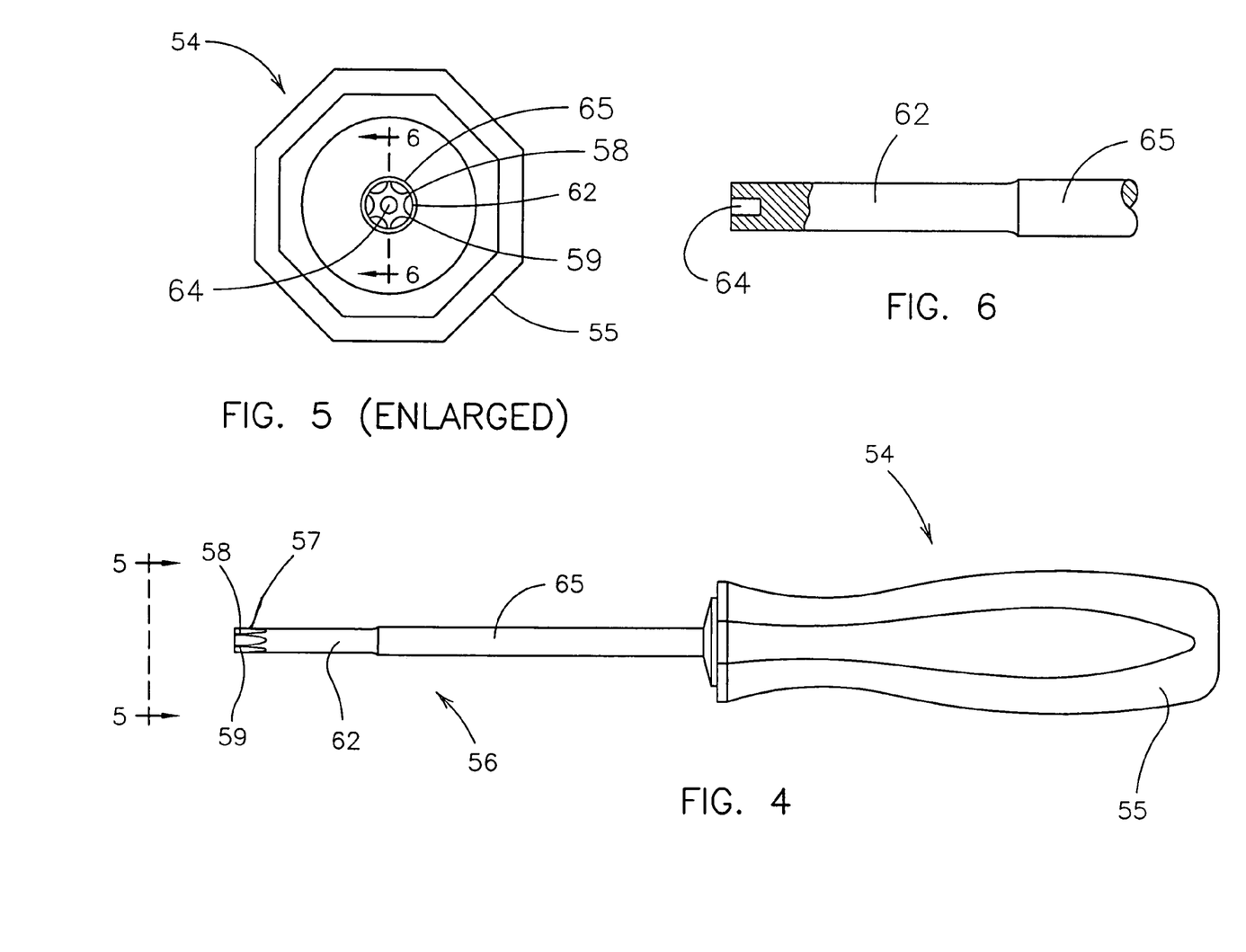
FIG. 4 is a side view of the tool for activating the fastening assembly.
FIG. 5 is a left end view of the tool of FIG. 4 to an enlarged scale taken substantially along the line of 5-5 of FIG. 4.
FIG. 6 is a partial side view of the left end of the tool with a portion broken away for clarity taken substantially along the line 6-6 of FIG. 5.

The star screw 31 is activated by the star screwdriver indicated generally at 54 in FIG. 4. Screwdriver 54 has a handle 55, a shank, indicated generally at 56, and a head indicated generally at 57. Head 57 terminates in six ribs, two of which are indicated at 58 and 59 in FIGS. 4 and 5. All six ribs are shown in FIG. 5 but are not numbered for purposes of clarity.

Figure 7:
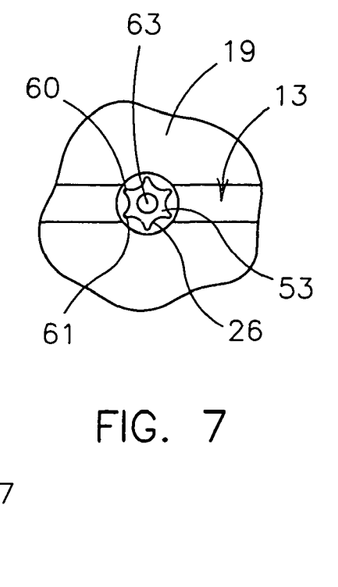
FIG. 7 is a partial front view of FIG. 3 taken substantially along the line 7-7 of FIG. 3.

Referring now to FIG. 7 it will be seen that star screw head 41 has a star shaped socket indentation 53 having six seats formed therein, said socket matching the fluted or ribbed head 57 of screwdriver 54. Two seats 60 and 61 of the socket 53 would receive flutes or ribs 58 and 59 of the head 57 of the screwdriver. Thus, the further the screwdriver 54 drives the threaded shank 43 of screw 31 into the thick end 34 of rivet nut 33, the greater will be the outward jamming pressure on the prongs 47, 48 etc. and consequently the tighter will be the wedging connection between faceplate 10 and supporting structure 21.

The star screw head 41 has a center pin 63 which mates with recess 64 in the head 57 of screwdriver 54.

It will be understood that rivet nuts and star screwdrivers are off the shelf items and indeed such conventional components are used in the invention. However, the conventional, as purchased condition of the screwdriver is preferably modified by reducing the diameter of the shank 56 at the engagement end thereof. Thus, outer section 62 of shank 56 has a smaller diameter than that portion 65 of the shank next to the handle 55. At the same time the socket 53 is of a smaller than conventional size so as to, firstly, match the configuration of the flutes 58, 59 on head 57 of the screwdriver, and secondly to decrease the diameter of front hole 15 of faceplate 10 so that a standard sized star screwdriver having a diameter equal to portion 65 all the way to the left end of shank 56 cannot gain access to the socket 53 in the top surface 26 of the tapered end 42 of the star screw 31.

In operation, after assembly of the screw 31, tubing 32 and rivet nut 33 with hole 28 in supporting structure 21, the star screwdriver is applied just sufficiently to snug up the assembled parts. After four such assemblies have been so assembled to the supporting structure, as represented by access holes 15, 16, 17 and 18 of FIG. 1, the faceplate 10 is then slid onto the outwardly projecting assemblies. Once the faceplate is received on the four fastening assemblies, the star screwdriver 54 engages screw 31 through hole 15 to cause the taper 42 on the head of the screw to expand the prongs 38, 39, etc. outwardly into engagement with the bore wall of hole 24. Preferably the prongs are deformed, as indicated in FIG. 3, to an extent less than their elastic limit. Stainless steel is the preferred material for tubing 32 and its associated prongs 38, 39.

When it is desired to activate the niche behind faceplate 10 at a future date—which may be years after initial installation—the star screwdriver 54 rotates the screw 31 in the opposite direction, the prongs relax, and the faceplate 10 is lifted off. After the niche is filled with an urn or other object and sealed, the faceplate is again attached to the supporting structure as above described and the screw 31 is tightened as hard as possible so that removal of the faceplate is made as difficult as possible.

Although star screwdrivers are available in standard sizes, the inability of a star screwdriver of a standard size to be used to loosen screw 31 is prevented by reducing the diameter of the shank section 62 and the head 57 to a size intermediate two standard star screwdriver sizes. As a result, a standard or conventional size star screwdriver whose diameter is slightly larger than faceplate hole 15, that is, the width of shank portion 65, cannot enter hole 15, and the next smaller standard size star screwdriver will have a head too small to engage the seats 60, 61 etc. in head 41 with enough gripping force to rotate screw 31.

Although a specific embodiment has been described in detail it will at once be apparent to those skilled in the art that modifications can be made within the spirit and scope of the invention. Accordingly, it is intended that the scope of the invention not be limited by the foregoing exemplary description, but rather only by the scope of the hereafter appended claims when interpreted in light of the relevant prior art.

The invention claimed is:

1. A system for securing a visible facing object to a rigid supporting structure using fastening means, said system including
   a supporting structure,
   a visible facing object of stone or similar frangible material having an exterior viewable surface and edges around its periphery,
   fastening means fixed with respect to the supporting structure for securing the visible facing object to the supporting structure by wedging the fastening means against the facing object,
   said fastening means being indistinguishable from the area surrounding the fastening means from a distance of about 2-4 feet during daylight conditions,
   said fastening means further being vandal proof using conventional tools,
   the fastening means being activateable only by modified conventional tool means,
   the fastening means including a small access hole in the visible facing object, said access hole being located inwardly from the peripheral edges thereof.

2. The system of claim 1 further characterized in that
   the visible facing object has a design on the exterior viewable surface thereof,
   said access hole being located in the design on the exterior viewable surface of the visible facing object,
   at least a portion of the design on the viewable surface of the visible facing object is linear,
   the widest dimension of the access hole being the same or substantially the same as that portion of the design within which it is located.

3. The system of claim 1 further characterized in that
   the fastening means includes screw means having a screw head for securing the visible facing object to the rigid supporting structure,
   aligning means in the screw head for receiving an actuating tool, said aligning means including a star screwdriver socket and
   the tool is a star screwdriver.

4. The system of claim 3 further characterized,
   firstly, in that the star screwdriver socket in the screw head is of a size different from the size required by a conventional star screwdriver socket, and
   secondly, in that the size of the head of the star screwdriver is different from a conventional star screwdriver head.

5. The system of claim 4 further characterized in that
   the size of the star screwdriver socket in the screw head and the size of the head of the star screwdriver are mating intermediate conventional star screwdriver sizes.

6. A system for securing a visible facing object to a rigid supporting structure using fastening means whereby, in use, the fastening means is indistinguishable from the area surrounding the fastening means from a distance of about 2-4 feet during daylight conditions and virtually vandal proof, said system including
   a supporting structure,
   a visible facing object of stone or similar frangible material, and
   fastening means fixed with respect to the supporting structure for securing the visible facing object to the supporting structure by wedging the fastening means against the facing object,
   said fastening means being indistinguishable from the area surrounding the fastening means from a distance of about 2-4 feet during daylight conditions,
   said fastening means further being virtually vandal proof,
   the fastening means is accessible through a small access hole in the exterior, viewable surface of the visible facing object extending part way into the body thereof, and further including
   a large access hole in the interior hidden surface of the visible facing object which is axially concentric with the small access hole and extends into the body of said object from the interior surface thereof until it connects with the small access hole,
   an opening in the supporting structure of a size suitable to slidably receive the threaded end of a rivet nut,
   a rivet nut screw having a head received in the larger access hole,
   a tube surrounding the rivet nut screw and extending between the rivet nut and the base of the large access hole,
   the size of the large access hole being slightly larger than (a) the diameter of the head of the rivet nut screw and (b) twice the thickness of the wall of the tube,
   the head of the screw having means aligned with the small access hole to receive a tool for activating the rivet nut,
   the aligned means in the screw head for receiving an actuating tool is a star screwdriver socket and
   the tool is a star screwdriver, and further characterized
   firstly, in that the star screwdriver socket in the screw head is of a size different from the size of a conventional star screwdriver socket of a conventional size, and
   secondly, in that the size of the head of the star screwdriver is different from a conventional star screwdriver head,
   the size of the star screwdriver socket in the head of the rivet nut screw and the size of the head of the star screwdriver are different from conventional star screwdriver sizes,
   the end of the tube which is received in the large access hole is slotted to form prongs which may be expanded outwardly thereby increasing wedging pressure on the wall of the hole upon application of the head of the screw upon the prongs.

7. The system of claim 6 further characterized in that the visible facing object is a faceplate of a columbarium.

8. The system of claim 6 further characterized in that the star screwdriver socket in the head of the rivet nut screw includes a centrally located center pin, and
   the head of the star screwdriver includes a recess which receives the center pin
   to thereby place the star screwdriver into operative engagement with the rivet nut screw.

9. A system for securing a visible facing object to a rigid supporting structure using fastening means whereby, in use, the fastening means is indistinguishable from the exterior viewable surface of the facing object surrounding the fastening means from about 2-4 feet during daylight conditions and virtually vandal proof, said system including
  a supporting structure,
  a visible facing object of stone or similar frangible material, and
  fastening means fixed with respect to the supporting structure for securing the visible facing object to the supporting structure by wedging the fastening means against the facing object,
  said fastening means being indistinguishable from the area surrounding the fastening means from about 2-4 feet during daylight conditions,
  the fastening means being accessible through a small access hole in the exterior, viewable surface of the visible facing object extending part way into the body thereof, and further including
  a large access hole in the interior hidden surface of the visible facing object which is axially concentric with the small access hole and extends into the body of said object from the interior surface thereof until it connects with the small access hole,
  an opening in the supporting structure of a size suitable to slidably receive the threaded end of a rivet nut,
  a rivet nut screw having a head received in the large access hole,
  a tube surrounding the rivet nut screw and extending between the rivet nut and the base of the large access hole,
  the size of the large access hole being slightly larger than (a) the diameter of the head of the rivet nut screw and (b) twice the thickness of the wall of the tube,
  the head of the screw having means aligned with the small access hole to receive a tool for activating the rivet nut,
  said fastening means further being virtually vandal proof.

10. In a method of assembling and disassembling a facing object of stone or similar frangible material having an access aperture to a structure located behind the facing object, said method being virtually vandal proof, the steps of
  providing anchor means which, when activated, becomes fixed to the structure,
  providing fastening means aligned with the access aperture for assembling and disassembling the facing object to the structure by wedging pressure after the anchor means is fixed to the structure,
  activating the fastening means initially by a tool to permanently fix the anchor means to the structure and simultaneously fasten the facing object to the structure, and
  thereafter activating the fastening means by said tool to disassemble the facing object from the structure while the fixed anchor means remains fixed to the structure,
  said fastening means fixing the facing object to the structure by wedging pressure exerted by the fastening means against the surface of a cavity located within the facing object, and
  thereafter assembling and disassembling the facing object to the structure any desired number of times by alternately applying and releasing the wedging pressure, all the while the anchor means remains fixed to the structure.

* * * * *

UNITED STATES PATENT AND TRADEMARK OFFICE
CERTIFICATE OF CORRECTION

| | | |
|---|---|---|
| PATENT NO. | : 7,788,860 B2 | Page 1 of 1 |
| APPLICATION NO. | : 10/614074 | |
| DATED | : September 7, 2010 | |
| INVENTOR(S) | : Ronald R. Zartman et al. | |

It is certified that error appears in the above-identified patent and that said Letters Patent is hereby corrected as shown below:

Title Page,
Page 1, column 1:
    item 12: Delete "Bartman"; insert -- Zartman --;

item 76: Delete "Bartman"; insert -- Zartman --.

Signed and Sealed this

Twenty-first Day of December, 2010

David J. Kappos
*Director of the United States Patent and Trademark Office*